United States Patent [19]

Hasegawa

[11] Patent Number: 5,751,682
[45] Date of Patent: May 12, 1998

[54] COMPACT SIZE MAGNETO-OPTICAL HEAD WITH A HOLOGRAM AND A BEAM SPLITTING MEANS

[75] Inventor: Shinya Hasegawa, Kawasaki, Japan

[73] Assignee: Fujitsu Limited, Kawasaki, Japan

[21] Appl. No.: 727,752

[22] Filed: Oct. 8, 1996

[30] Foreign Application Priority Data

Mar. 11, 1996 [JP] Japan ................................ 8-052972

[51] Int. Cl.$^6$ ........................................ G11B 7/09
[52] U.S. Cl. ................ 369/112; 369/103; 369/110; 369/44.23; 369/44.12
[58] Field of Search .................... 369/13, 44.23, 369/110, 112, 103, 109, 122, 44.12

[56] References Cited

U.S. PATENT DOCUMENTS

| | | | |
|---|---|---|---|
| 5,483,509 | 1/1996 | Yang et al. | 369/112 |
| 5,579,291 | 11/1996 | Matsumoto | 369/112 |
| 5,583,843 | 12/1996 | Horinouchi | 369/103 |
| 5,619,482 | 4/1997 | Tezuka et al. | 369/103 |
| 5,621,714 | 4/1997 | Kobayashi et al. | 369/103 |

*Primary Examiner*—Georgia Y. Epps
*Assistant Examiner*—Kim-Kwok Chu
*Attorney, Agent, or Firm*—Armstrong, Westerman, Hattori, McLeland, & Naughton

[57] ABSTRACT

An optical head for a magneto-optical disk drive, including a laser diode mounted on a stem, a first photodetector unit for detecting a magneto-optical signal, and a second photodetector unit for detecting a focusing error signal and a tracking error signal. The optical head further includes a cap mounted on the stem so as to surround the laser diode and the first and second photodetector units, a beam splitter unit mounted on the cap, and a hologram mounted on the cap. The beam splitter unit includes a polarization beam splitter, an optical rotating film for rotating a polarization plane of a part of a beam reflected on a magneto-optical disk by 45 degrees, and a Rochon prism. The hologram diffracts a part of the reflected beam from the magneto-optical disk toward the second photodetector unit.

11 Claims, 6 Drawing Sheets

COMPACT SIZE MAGNETO-OPTICAL HEAD WITH A HOLOGRAM AND A BEAM SPLITTING MEANS

BACKGROUND OF THE INVENTION

1. Field of the Invention

The present invention relates to an optical head (optical pickup) for an optical disk drive.

2. Description of the Related Art

An optical disk including a magneto-optical disk is in the limelight as a memory medium which has become the core in the rapid development of multimedia in recent years. Usually, the optical disk is accommodated in a cartridge for actual use. An optical disk cartridge is loaded into an optical disk drive to read/write data on the optical disk by an optical head.

A recording medium such as an optical disk and a magneto-optical disk is replaced by another similar recording medium in use, and each of these recording media has a warpage or undulation due to strain in molding. As a result, such a recording medium tends to have eccentricity and inclination. Accordingly, focusing error detection and tracking error detection must be performed to read information recorded on the recording medium. A conventional optical head for a magneto-optical disk drive is configured by using many optical components including a plurality of lenses and a plurality of polarization beam splitters, so as to perform detection of information written on a magneto-optical disk and also perform focusing error detection and tracking error detection.

As other conventional optical heads, there has been proposed an optical head for an optical disk drive, using a hologram. The hologram is integrated with a laser diode and a photodetector to perform error detection of a laser beam for servo control. Such a conventional optical head using the hologram is effective for a CD driver or a CD-ROM driver. However, since such a conventional optical head for an optical disk drive does not have a polarization separating function required for magneto-optical signal detection, so that the optical head cannot be applied directly to a magneto-optical disk drive.

As mentioned above, the conventional optical head for the magneto-optical disk drive requires many optical components, causing a complex structure and an increased man-hour for assembly. Further, the conventional optical head using the hologram cannot be applied directly to a magneto-optical disk drive performing magneto-optical signal detection.

SUMMARY OF THE INVENTION

It is therefore an object of the present invention to provide an optical head for a magneto-optical disk drive which can be reduced in number of optical components, man-hour for adjustment, and size and weight.

In accordance with an aspect of the present invention, there is provided an optical head for a magneto-optical disk drive, for reading and writing information on a magneto-optical disk, comprising a stem; a laser diode fixed to the stem; an objective lens for focusing a laser beam emitted from the laser diode onto the magneto-optical disk; a first photodetector fixed to the stem, for detecting a magneto-optical signal from a reflected beam reflected on the magneto-optical disk; a second photodetector fixed to the stem, for detecting a focusing error signal and a tracking error signal of the laser beam focused on the magneto-optical disk, from the reflected beam; a cap mounted on the stem so as to surround the laser diode, the first photodetector, and the second photodetector; a hologram mounted on the cap, for diffracting a part of the reflected beam toward the second photodetector; and a beam splitter unit mounted on the cap, the beam splitter unit comprising a polarization beam splitter, an optical rotating means for rotating a polarization plane of a part of the reflected beam by 45 degrees, and a beam separating means formed of a doubly refracting crystal.

Preferably, the beam separating means formed of the doubly refracting crystal comprises a polarizing prism such as a Rochon prism or a Wollaston prism. Further, each of the polarization beam splitter and the optical rotating means which rotates a polarization plane by 45 degrees is formed from a dielectric multilayer film.

According to the present invention, the beam splitter unit configured by integrating a plurality of optical components is mounted on the cap surrounding the laser diode and the optical detectors. Accordingly, it is possible to realize a small-sized optical head for a magneto-optical disk drive which can be reduced in number of optical components and man-hour for adjustment.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
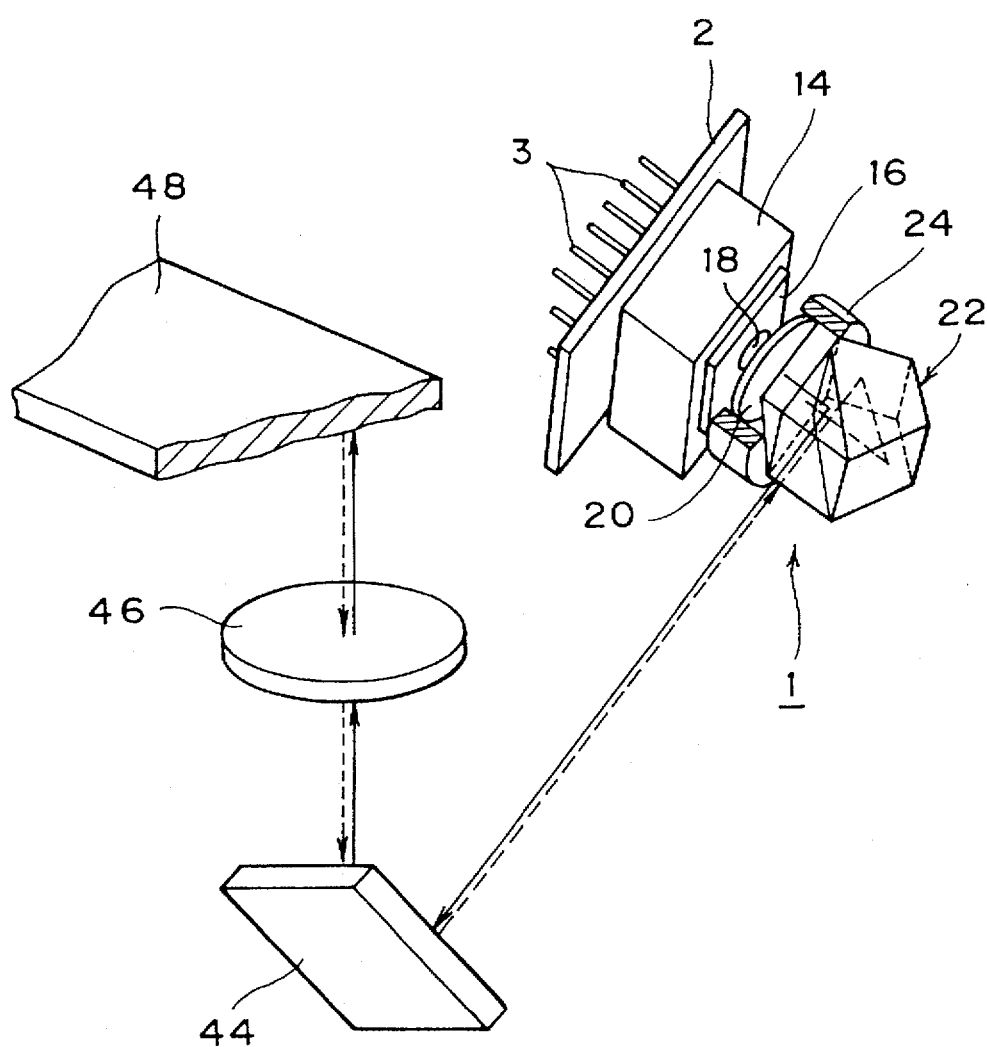
FIG. 1 is a general perspective view of a first preferred embodiment of the present invention.
Figure 2:
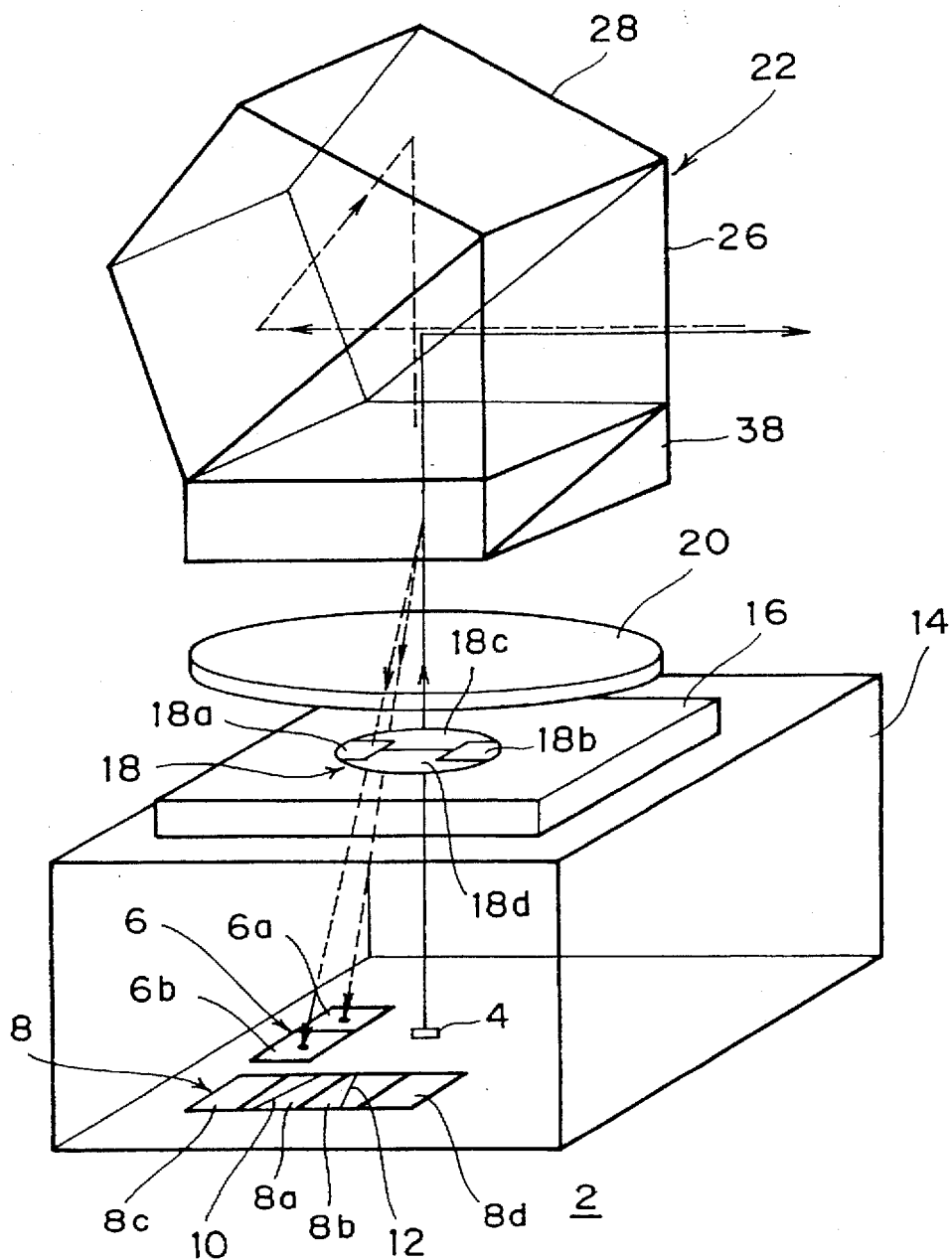
FIG. 2 is an enlarged perspective view of the first preferred embodiment.

An optical head for a magneto-optical disk drive according to a first preferred embodiment of the present invention will now be described with reference to FIGS. 1 to 4. As shown in FIG. 1, an optical head 1 reads or writes information from or to a magneto-optical disk 48. As shown in FIG. 2, mounted on the upper surface of a stem 2 by die bonding or the like a laser diode 4, a photodetector unit (photodiode unit) 6 for detecting a magneto-optical signal, and a photodetector unit 8 for detecting a focusing error signal and a tracking error signal. A plurality of terminals 3 project from the back surface of the stem 2 opposite to the upper surface thereof.

The photodetector unit 6 includes a photodetector 6a for detecting a P-polarized light component and a photodetector 6b for detecting an S-polarized light component. The two light components thus detected by the two photodetectors 6a and 6b are subjected to differential detection by a method well known in the related art, thereby detecting a magneto-optical signal. The photodetector unit 8 includes photodetectors 8a and 8b for detecting a focusing error signal and photodetectors 8c and 8d for detecting a tracking error signal. The photodetector 8a is divided into two regions by a dividing line 10, and the photodetector 8b is also divided into two regions by a dividing line 12.

A cap 14 is mounted on the stem 2 so as to surround the laser diode 4, the photodetector unit 6, and the photodetector unit 8. The upper surface of the cap 14 is formed with an opening (not shown), and a glass base 16 is mounted on the upper surface of the cap 14 so as to cover this opening. A hologram diffraction grating 18 is formed on the glass base 16. The hologram 18 has four different interference fringe regions 18a, 18b, 18c, and 18d. Beams incident on these four regions 18a to 18d are diffracted in different directions by the hologram 18.

The regions 18a and 18b of the hologram 18 are used for detection of a focusing error signal (FES), and the regions 18c and 18d of the hologram 18 are used for detection of a tracking error signal (TES). The sizes of these regions 18a to 18d are decided according to the distribution of light quantities demanded by any magneto-optical disk drives. The beams diffracted by the regions 18a and 18b respectively enter the photodetectors 8a and 8b for detecting a focusing error signal, whereas the beams diffracted by the regions 18c and 18d respectively enter the photodetectors 8c and 8d for detecting a tracking error signal.

Letting A denote a quantity of light incident on the region of the photodetector 8a on the right side of the dividing line 10, B denote a quantity of light incident on the region of the photodetector 8a on the left side of the dividing line 10, C denote a quantity of light incident on the region of the photodetector 8b on the left side of the dividing line 12, and D denote a quantity of light incident on the region of the photodetector 8b on the right side of the dividing line 12, the focusing error signal (FES) can be detected in accordance with the following equation.

$$FES=(A+C)-(B+D)$$

On the other hand, letting E denote a quantity of light incident on the photodetector 8c, and F denote a quantity of light incident on the photodetector 8d, the tracking error signal (TES) can be detected in accordance with the following equation.

$$TES=(E-F)$$

The hologram may be produced by direct drawing of an electron beam or a laser beam, for example. In the direct drawing, it is necessary to incline an interference fringe section of the hologram for the purpose of high efficiency; however, the production of the hologram is allowed by multiplex drawing. Other producing methods for the hologram include a method by directly drawing a large hologram pattern in advance, reducing the hologram pattern by a stepper to prepare a mask, and transferring this reduced pattern by photolithography. In this case, photoresist or the like is used as the mask, and an interference fringe pattern is formed by etching with an ion beam. In modification, the interference fringe pattern may be formed by holographic exposure using a hologram as an auxiliary exposure system.

Figure 3:
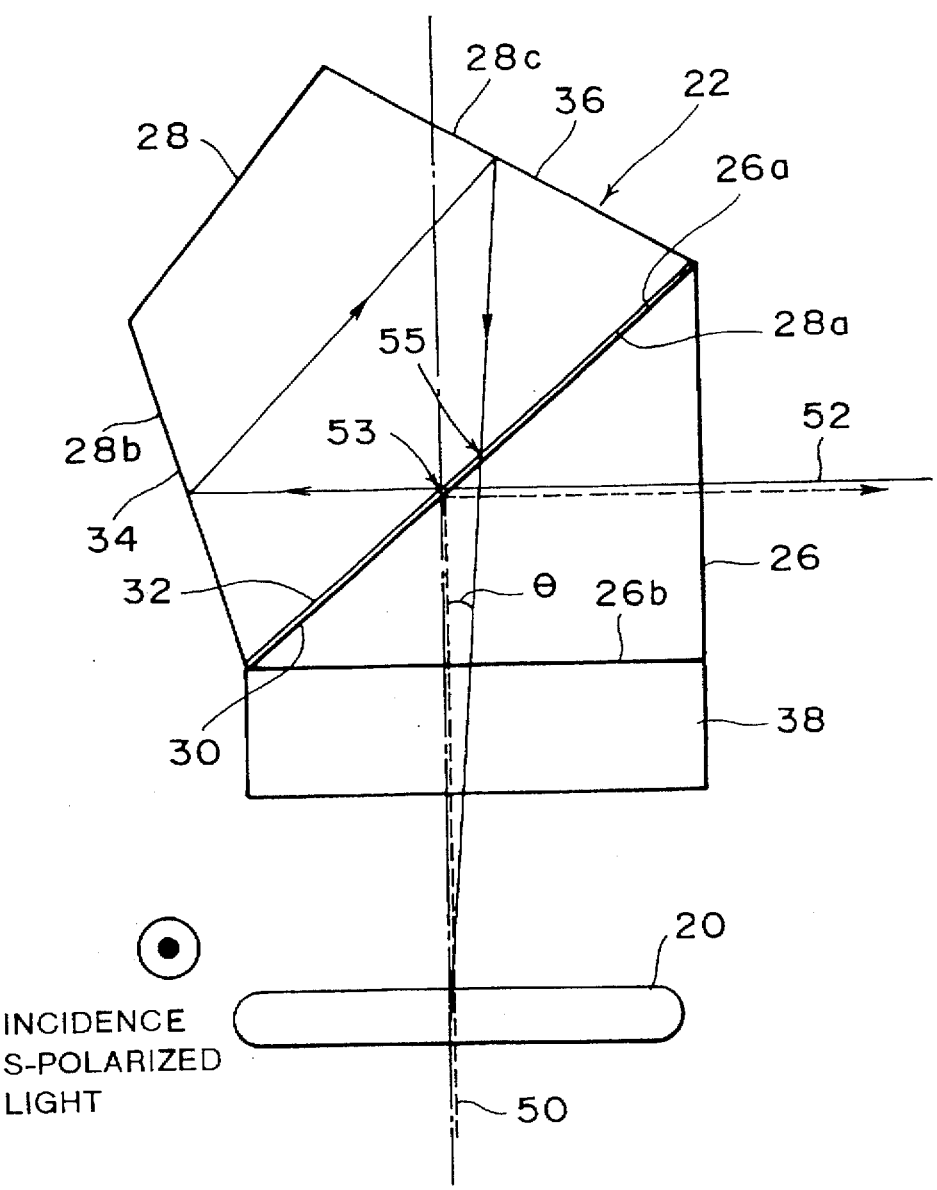
FIG. 3 is an elevational view of a beam splitter unit in the first preferred embodiment.

As shown in FIG. 1, a collimator lens 20 and a beam splitter unit 22 are integrated together by a holder 24, and are mounted on the upper surface of the cap 14. The collimator lens 20 converts a laser beam emitted from the laser diode 4 into a collimated beam. As best shown in FIG. 3, the beam splitter unit 22 includes a right-angle prism 26, a quadrangular prism 28 bonded to an oblique surface 26a of the right-angle prism 26, and a Rochon prism 38 bonded to a bottom surface 26b of the right-angle prism 26.

A polarization beam splitter 30 formed from a dielectric multilayer film is deposited on the oblique surface 26a of the right-angle prism 26, and an optical rotating film 32 formed from a dielectric multilayer film is laminated on the polarization beam splitter 30. The polarization beam splitter 30 has a transmittance of 100% for P-polarized light, and has a reflectance of 75% for S-polarized light. The optical rotating film 32 has a property of rotating by 45 degrees a polarization plane of a beam reflected on the magneto-optical disk 48.

The optical rotating film 32 and the polarization beam splitter 30 may be deposited in this order on a bottom surface 28a of the quadrangular prism 28, rather than depositing the polarization beam splitter 30 and the optical rotating film 32 in this order on the oblique surface 26a of the right-angle prism 26. The quadrangular prism 28 has opposite side surfaces 28b and 28c inclined at acute angles to the bottom surface 28a. Reflecting films 34 and 36 are formed on the side surfaces 28b and 28c of the quadrangular prism 28, respectively. The reflecting films 34 and 36 have a property such that there occurs no phase difference between beams reflected on the reflecting films 34 and 36.

Figure 4:
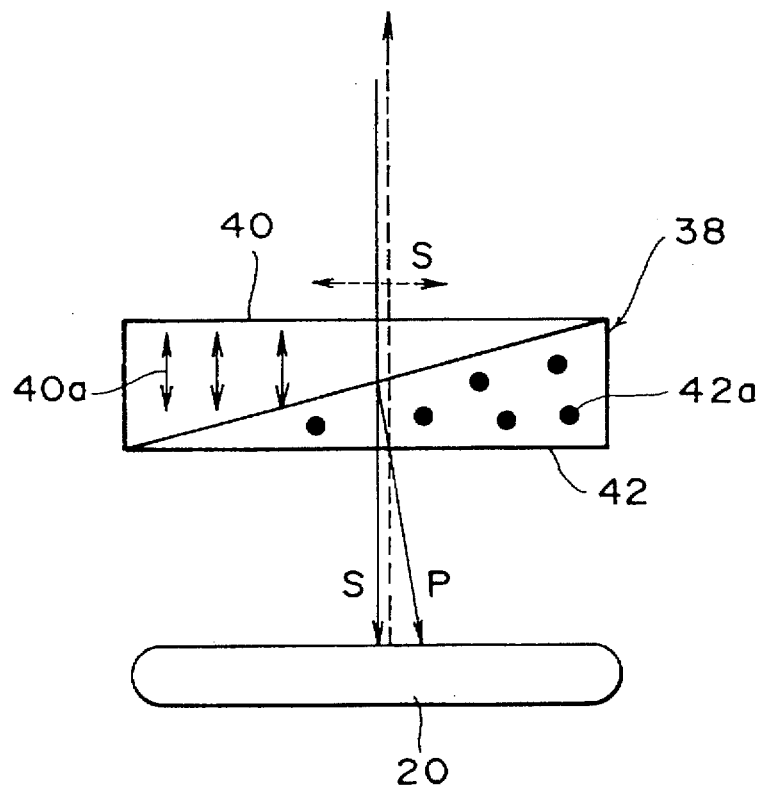
FIG. 4 is a right side view of a Rochon prism shown in FIG. 3.

As shown in FIG. 4, the Rochon prism 38 is composed of two right-angle prisms 40 and 42 bonded together by balsam. The right-angle prisms 40 and 42 are formed of doubly refracting crystals cut off so that their optic axes 40a and 42a are perpendicular to each other. The optic axes 40a and 42a of the right-angle prisms 40 and 42 are perpendicular to a polarization plane of S-polarized light. Calcite, quartz, lithium niobate ($LiNbO_3$), etc. may be adopted as the doubly refracting crystals. The Rochon prism 38 may be replaced by any other polarizing prism such as a Wollaston prism.

Referring again to FIG. 1, a laser beam from the beam splitter unit 22 is reflected by a mirror 44, and is next focused on the magneto-optical disk 48 by an objective lens 46.

In operation, a laser beam of linearly polarized light is emitted from the laser diode 4. The laser diode 4 is located relative to the beam splitter unit 22 so that the laser beam emitted from the laser diode 4, having a polarization plane of S-polarized light to the polarization beam splitter 30 enters the beam splitter unit 22. The laser beam emitted from the laser diode 4 is passed through the hologram 18, and is next converted into a collimated beam by the collimator lens 20. The collimated beam enters the Rochon prism 38 at substantially right angles thereto, so that the collimated beam straight advances through the Rochon prism 38 to enter the right-angle prism 26.

Then, the collimated beam is reflected with a reflectance of about 75% by the polarization beam splitter 30 formed at the interface between the right-angle prism 26 and the quadrangular prism 28. This beam is shown by a broken line 50 in FIG. 3. The laser beam reflected by the polarization beam splitter 30 is next reflected by the mirror 44 and focused on the magneto-optical disk 48 by the objective lens 46 as shown in FIG. 1.

A reflected beam 52 from the magneto-optical disk 48 is slightly rotated in its polarization by a Kerr effect when information is recorded on the magneto-optical disk 48. Accordingly, while the reflected beam 52 from the magneto-optical disk 48 is mainly S-polarized light, the reflected beam 52 contains a small proportion of P-polarized light component. As shown in FIG. 3, the reflected beam 52 enters the polarization beam splitter 30, and 25% of the S-polarized light component and 100% of the P-polarized light component of the reflected beam 52 is transmitted by the polarization beam splitter 30, thereby relatively amplifying a minute signal of P-polarized light.

The reflected beam transmitted by the polarization beam splitter 30 enters the optical rotating film 32 at a point 53, and a polarization plane of the incident beam is rotated by 45 degrees by the optical rotating film 32. Then, the beam outgoing from the optical rotating film 32 is reflected by the reflecting films 34 and 36 respectively formed on the side surfaces 28b and 28c of the quadrangular prism 28 to again enter the optical rotating film 32 at a point 55. At this time, the polarization plane of the beam is not rotated by the optical rotating film 32, but the optical rotating film 32 has a property of compensating for a phase difference between P-polarized light and S-polarized light. The beam passed through the optical rotating film 32 enters the polarization beam splitter 30 again.

Since the polarization beam splitter 30 transmits 25% of S-polarized light and 100% of P-polarized light, it can be said that 6.25% of the S-polarized light component of the reflected beam and 100% of the P-polarized light component of the reflected beam are finally transmitted by the polarization beam splitter 30. The reflected beam transmitted again by the polarization beam splitter 30 enters the Rochon prism 38 at an incident angle θ. That is, a part of the reflected beam 52 from the magneto-optical disk 48 enters the Rochon prism 38 at an angle θ of inclination to an optical path of the laser beam 50 from the laser diode 4.

This angle θ is determined by an apex angle of the quadrangular prism 28 (an angle formed by the side surfaces 28b and 28c). Preferably, the angle θ is in the range of about 3 degrees to about 10 degrees. In this preferred embodiment, the angle θ is set to 5 degrees. In the case that the angle θ is equal to 0 degree, it is necessary to locate the photodetectors 6a and 6b for detecting a magneto-optical signal on the opposite sides of the laser diode 4.

As shown in FIG. 4, the S-polarized light obliquely incident on the Rochon prism 38 (see FIG. 3) straight advances through the Rochon prism 38 to outgo therefrom. On the other hand, the P-polarized light incident on the Rochon prism 38 is refracted at the boundary of the prisms 40 and 42 to advance obliquely with respect to the incident beam and outgo from the Rochon prism 38 due to the double refraction property of the Rochon prism 38. The two beams outgoing from the Rochon prism 38 are converged by the collimator lens 20 to pass through the hologram 18, then entering the photodetectors 6a and 6b for detecting a magneto-optical signal. The magneto-optical signal is detected by detecting a difference in light quantity between the two beams entered the two photodetectors 6a and 6b.

The detection of a focusing error signal and a tracking error signal is performed by utilizing the S-polarized light component of the reflected beam 52 reflected by the polarization beam splitter 30 and advancing on the same optical path as that of the beam from the laser diode 4 in the opposite direction, because about 75% of the S-polarized light component of the reflected beam 52 is reflected by the polarization beam splitter 30. This beam of S-polarized light reflected by the polarization beam splitter 30 enters the hologram 18, and is next diffracted in different directions by the four regions 18a to 18d of the hologram 18, then entering the photodetectors 8a to 8d for detecting error signals. Thus, the focusing error signal and the tracking error signal are detected by the photodetectors 8a to 8d.

Figure 5:
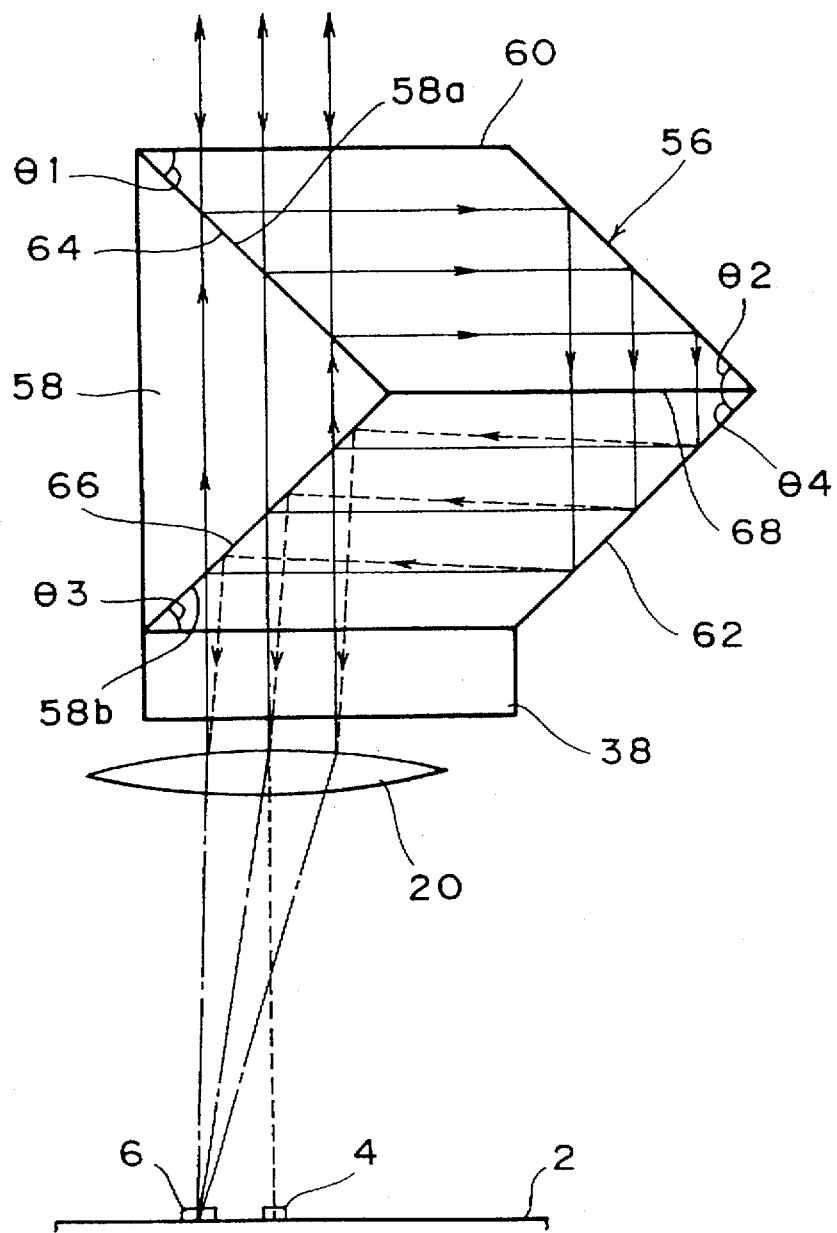
FIG. 5 is an elevational view of a beam splitter unit in a second preferred embodiment of the present invention.

Referring to FIG. 5, there is shown an elevational view of a beam splitter unit 56 in a second preferred embodiment of the present invention. The beam splitter unit 56 includes a right-angle prism 58, a parallelogram prism 60 bonded to one surface 58a of the right-angle prism 58, a quadrangular prism 62 bonded to another surface 58b of the right-angle prism 58, and a Rochon prism 38 bonded to a bottom surface of the parallelogram prism 62. Two polarization beam splitters 64 and 66 are formed on the surfaces 58a and 58b of the right-angle prism 58, respectively. A half-wave plate 68 is inserted at the interface between the parallelogram prism 60 and the quadrangular prism 62. The polarization beam splitters 64 and 66 have a property of transmitting 75% of P-polarized light and reflecting 99% of S-polarized light.

Each of two apex angles θ1 and θ2 of the parallelogram prism 60 is set to 45 degrees. On the other hand, one apex angle θ3 of the quadrangular prism 62 is set to 45 degrees, and the other apex angle θ4 of the quadrangular prism 62 is set slightly less than 45 degrees. The reason why the apex angle θ4 of the quadrangular prism 62 is set less than 45 degrees is to allow oblique incidence of a reflected beam from the magneto-optical disk on the Rochon prism 38 as shown by the broken lines in FIG. 5.

In this preferred embodiment, a laser beam of P-polarized light to the polarization beam splitters 64 and 66 is allowed to enter the beam splitter unit 56. About 75% of this laser beam is transmitted by each of the polarization beam splitters 66 and 64, and is next focused on the magneto-optical disk by an objective lens. The reflected beam from the magneto-optical disk is slightly rotated in polarization by a Kerr effect when information is recorded on the magneto-optical disk. Accordingly, while the reflected beam is mainly P-polarized light, it contains a small proportion of S-polarized light component.

The reflected beam enters the polarization beam splitter 64. At this time, 25% of the P-polarized light and 99% of the S-polarized light are reflected by the polarization beam splitter 64, thereby relatively amplifying a minute signal of S-polarized light. The beam reflected by the polarization beam splitter 64 is reflected by the parallelogram prism 60 to enter the half-wave plate 68. At this time, the polarization plane of the incident beam is rotated by 45 degrees by the half-wave plate 68. After passed through the half-wave plate 68, the beam is reflected by the quadrangular prism 62 in a direction slightly upward inclined as shown by the broken lines in FIG. 5. Thereafter, 25% of the P-polarized light and 99% of the S-polarized light of the reflected beam are reflected by the polarization beam splitter 66 to enter the Rochon prism 38 at an incident angle of about 5 degrees as shown by the broken lines.

The beam incident on the Rochon prism 38 is separated into a P-polarized light beam and an S-polarized light beam by the Rochon prism 38 like the first preferred embodiment, and the two beams are detected by the photodetectors 6a and 6b shown in FIG. 2. The detection of a focusing error signal and a tracking error signal is performed by utilizing a beam transmitted by the polarization beam splitters 64 and 66, of the reflected beam from the magneto-optical disk. The transmitted beam from the polarization beam splitters 64 and 66 is diffracted in four different directions by the hologram 18 shown in FIG. 2, and the resultant four diffracted beams are detected by the photodetectors 8a and 8b for detecting a focusing error signal and the photodetectors 8c and 8d for detecting a tracking error signal.

Figure 6:
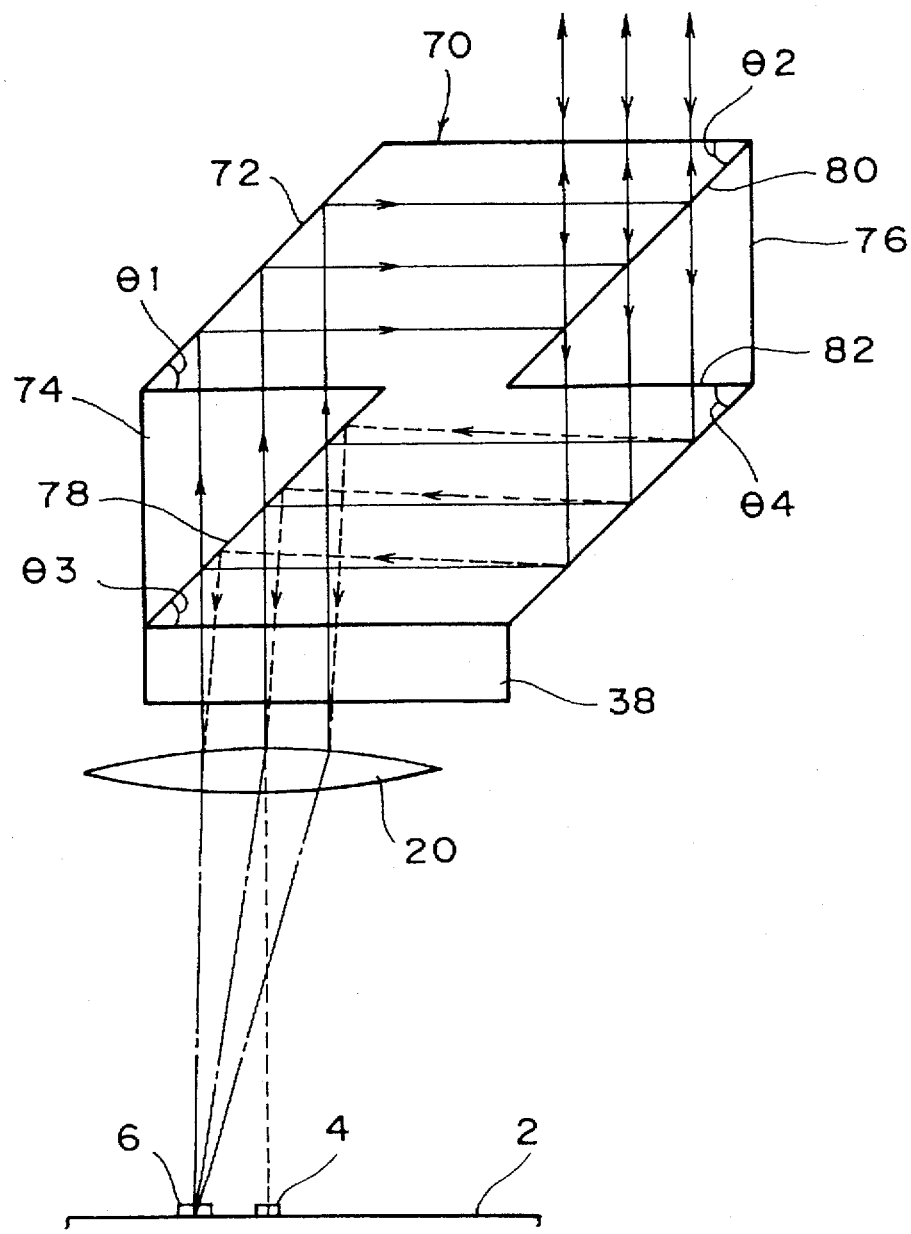
FIG. 6 is an elevational view of a beam splitter unit in a third preferred embodiment of the present invention.

Referring to FIG. 6, there is shown an elevational view of a beam splitter unit 70 according to a third preferred embodiment of the present invention. The beam splitter unit 70 includes a prism 72 having such a shape as shown, two right-angle prisms 74 and 76, and a Rochon prism 38. A polarization beam splitter 78 is formed at the interface between the prism 72 and the right-angle prism 74, and a polarization beam splitter 80 is formed at the interface between the prism 72 and the right-angle prism 76.

The polarization beam splitter 78 has a property of transmitting 75% of P-polarized light and reflecting 99% of S-polarized light. On the other hand, the polarization beam splitter 80 has a property of reflecting 75% of P-polarized light and transmitting 99% of S-polarized light. A half-wave plate 82 is inserted between the prism 72 and the right-angle prism 76. Each of three apex angles θ1, θ2, and θ3 of the prism 72 is set to 45 degrees, and the remaining apex angle θ4 is set slightly less than 45 degrees, for the purpose of allowing oblique incidence of the reflected beam from the magneto-optical disk on the Rochon prism 38.

Also in this preferred embodiment, the laser diode 4 is located relative to the beam splitter unit 70 so that the laser beam of P-polarized light to the polarization beam splitter 78 enters the beam splitter unit 80 like the second preferred embodiment shown in FIG. 5.

In operation, 75% of the laser beam emitted from the laser diode 4 is transmitted by the polarization beam splitter 78, and 75% of a transmitted beam from the polarization beam splitter 78 is reflected by the polarization beam splitter 80 to be focused on the magneto-optical disk by the objective lens. The reflected beam from the magneto-optical disk is slightly rotated in polarization by a Kerr effect when information is recorded on the magneto-optical disk. Accordingly, while the reflected beam is mainly P-polarized light, it contains a small proportion of S-polarized light component.

25% of the P-polarized light component of the reflected beam is transmitted by the polarization beam splitter 80, and 99% of the S-polarized light component of the reflected beam is transmitted by the polarization beam splitter 80. The polarization plane of the beam transmitted by the polarization beam splitter 80 is rotated by 45 degrees by the half-wave plate 82, and the beam passed through the half-wave plate 82 is totally reflected by the prism 72 in a direction slightly upward inclined as shown by the broken lines in FIG. 6 to enter the polarization beam splitter 78. At this time, 25% of the P-polarized light and 99% of the S-polarized light are reflected by the polarization beam splitter 78. The beam reflected by the polarization beam splitter 78 next enters the Rochon prism 38 at an incident angle of about 5 degrees.

The incident beam on the Rochon prism 38 is separated into a P-polarized light beam and an S-polarized light beam by the Rochon prism 38, and the two beams are differentially detected by the photodetector unit 6 to detect a magneto-optical signal. On the other hand, the detection of a focusing error signal and a tracking error signal is performed by utilizing a beam reflected by the polarization beam splitter 80 and transmitted by the polarization beam splitter 78, of the reflected beam from the magneto-optical disk. This beam is diffracted in four different directions by the hologram 18 shown in FIG. 2, and the resultant four diffracted beams are allowed to enter the photodetectors 8a and 8b for detecting a focusing error signal and the photodetectors 8c and 8d for detecting a tracking error signal.

According to the present invention as described above, the beam splitter unit having the integrated polarization beam splitter and polarizing prism is adopted, and the hologram is combined with the beam splitter unit to configure the optical head. Accordingly, it is possible to provide an optical head for a magneto-optical disk drive which can be reduced in size and cost and can be improved in reliability.

What is claimed is:

1. An optical head for an optical disk drive, for reading and writing information on an optical disk, comprising:

a laser diode;

a first photodetector for detecting an optical signal from a reflected beam reflected on said optical disk;

a second photodetector for detecting a focusing error signal and a tracking error signal of a laser beam focused on said optical disk, from said reflected beam;

a hologram for diffracting a part of said reflected beam toward said second photodetector; and a beam splitter unit including a polarization beam splitter, optical rotating means for rotating a polarization plane of a part of said reflected beam by 45 degrees, and beam separating means for separating the reflected beam into P-polarized light component and S-polarized light component.

2. An optical head for an optical disk drive according to claim 1, wherein:

said beam splitter unit further includes said optical rotating means, a right-angle prism having an oblique surface and a polygonal prism having a bottom surface bonded to said oblique surface of said right-angle prism, said polygonal prism having first and second side surfaces each inclined at an acute angle to said bottom surface; and said polarization beam splitter and said optical rotating means are formed at an interface between said right-angle prism and said polygonal prism, and are arranged in this order from said right-angle prism.

3. An optical head for an optical disk drive according to claim 2, wherein each of said polarization beam splitter and said optical rotating means is formed from a dielectric multilayer film.

4. An optical head for an optical disk drive according to claim 3, wherein said beam splitter unit further includes reflecting films formed on said first and second side surfaces of said polygonal prism, said reflecting films having a property of generating no phase difference between beams reflected on said reflecting films.

5. An optical head for an optical disk drive according to claim 3, wherein a part of said reflected beam is obliquely passed through said polarization beam splitter and said optical rotating means in this order, next reflected on said first and second side surfaces of said polygonal prism, next again passed through said optical rotating means and said polarization beam splitter in this order, and next enters said beam separating means at a given incident angle inclined to an optical path of said laser beam emitted from said laser diode to enter said beam splitter unit.

6. An optical head for an optical disk drive according to claim 1, wherein said beam splitter unit is located relative to said laser diode so that said laser beam having a polarization plane of S-polarized light to said polarization beam splitter enters said beam splitter unit.

7. An optical head for an optical disk drive according to claim 6, further comprising:

a collimator lens for converting a laser beam emitted from said laser diode into a collimated beam; and an objective lens for focusing the laser beam emitted from said laser diode onto said optical disk;

said beam splitter unit being located between said collimator lens and said objective lens.

8. An optical head for an optical disk drive according to claim 1, wherein:

said beam splitter unit further includes said optical rotating means, a right-angle prism, a parallelogram prism having a bottom surface bonded to one of two surfaces of said right-angle prism forming a right angle of said right-angle prism, and a quadrangular prism bonded both to the other of said two surfaces of said right-angle prism and to said bottom surface of said parallelogram prism;

said polarization beam splitter includes a first polarization beam splitter and a second polarization beam splitter, said first polarization beam splitter being inserted at an interface between said right-angle prism and said parallelogram prism, said second polarization beam splitter being inserted at an interface between said right-angle prism and said quadrangular prism; and said optical rotating means includes a half-wave plate formed at an interface between said parallelogram prism and said quadrangular prism.

9. An optical head for an optical disk drive according to claim 8, wherein a part of said reflected beam is reflected by said first polarization beam splitter, next passed through said half-wave plate, next reflected by said second polarization beam splitter, and next enters said beam separating means at a given incident angle inclined to an optical path of said laser beam emitted from said laser diode to enter the beam splitter unit.

10. An optical head for an optical disk drive according to claim 8, further comprising:

a collimator lens for converting a laser beam emitted from said laser diode into a collimated beam; and an objective lens for focusing the laser beam emitted from said laser diode onto said optical disk;

said beam splitter unit being located between said collimator lens and said objective lens.

11. An optical head for a magneto-optical disk drive, for reading and writing information on a magneto-optical disk, comprising:

a stem;

a laser diode fixed to said stem;

an objective lens for focusing a laser beam emitted from said laser diode onto said magneto-optical disk;

a first photodetector fixed to said stem, for detecting a magneto-optical signal from a reflected beam reflected on said magneto-optical disk;

a second photodetector fixed to said stem, for detecting a focusing error signal and a tracking error signal of said laser beam focused on said magneto-optical disk, from said reflected beam;

a cap mounted on said stem so as to surround said laser diode, said first photodetector, and said second photodetector;

a hologram mounted on said cap, for diffracting a part of said reflected beam toward said second photodetector; and a beam splitter unit mounted on said cap, said beam splitter unit including a polarization beam splitter, an optical rotating means for rotating a polarization plane of a part of said reflected beam by 45 degrees, and a beam separating means for separating the reflected beam into P-polarized light component and S-polarized light component.

* * * * *